(12) United States Patent
Whalen

(10) Patent No.: US 6,368,372 B1
(45) Date of Patent: Apr. 9, 2002

(54) FLUID MEDIA PARTICLE ISOLATING SYSTEM

(75) Inventor: Paul S. Whalen, Pacific Grove, CA (US)

(73) Assignee: Intrabay Automation, Inc., Monterey, CA (US)

( * ) Notice: Subject to any disclaimer, the term of this patent is extended or adjusted under 35 U.S.C. 154(b) by 0 days.

(21) Appl. No.: 09/634,032

(22) Filed: Aug. 8, 2000

(51) Int. Cl.[7] .............................................. B01D 45/00
(52) U.S. Cl. .................... 55/385.2; 55/434; 55/DIG. 18
(58) Field of Search ............................. 55/385.1, 385.2, 55/DIG. 18, 434, 444, 467, 442; 95/272

(56) References Cited

U.S. PATENT DOCUMENTS

| | | | |
|---|---|---|---|
| 4,724,874 A | * | 2/1988 | Parikh et al. |
| 4,963,069 A | * | 10/1990 | Wurst et al. |
| 5,181,819 A | * | 1/1993 | Sakata et al. |
| 5,261,167 A | * | 11/1993 | Sakata |
| 5,261,935 A | * | 11/1993 | Ishii et al. |
| 5,459,943 A | * | 10/1995 | Tanahashi |
| 6,017,376 A | * | 1/2000 | Doig et al. |
| 6,050,891 A | * | 4/2000 | Nering |
| 6,097,469 A | * | 8/2000 | Yaegashi et al. |

* cited by examiner

Primary Examiner—Duane S. Smith
(74) Attorney, Agent, or Firm—David O'Reilly

(57) ABSTRACT

A fluid meter particle isolating system having a tortuous path formed between a pair of walls with an inlet and an outlet. The inlet is open to a contaminant-free (clean) zone while an outlet is open to a particle generating contaminated (dirty) zone. The walls include partitions that form a tortuous path separating it into a plurality of chambers. An impeller constructed of a plurality of open cells forming a piston-like structure is provided in the tortuous path and has an axis of motion parallel to the walls. Each cell forms a vessel for transmitting fluid media under a low pressure gradient from a clean zone toward a contaminated zone to prevent particles generated in the contaminated zone from migrating to the clean zone. Each vessel is formed by the four walls of each cell having a bottom surface contoured to provide a transition from one cell to the next through an exit port. Each vessel in the multiple cells is offset axially to provide a continuous flow from the vessel in the first cell sequentially to adjacent cells until it exits from an exit port in the last vessel in the last cell. The impeller follows the tortuous path between the two walls and effectively prevents particles generated in the contaminated zone from migrating and reaching the contaminant-free zone.

35 Claims, 9 Drawing Sheets

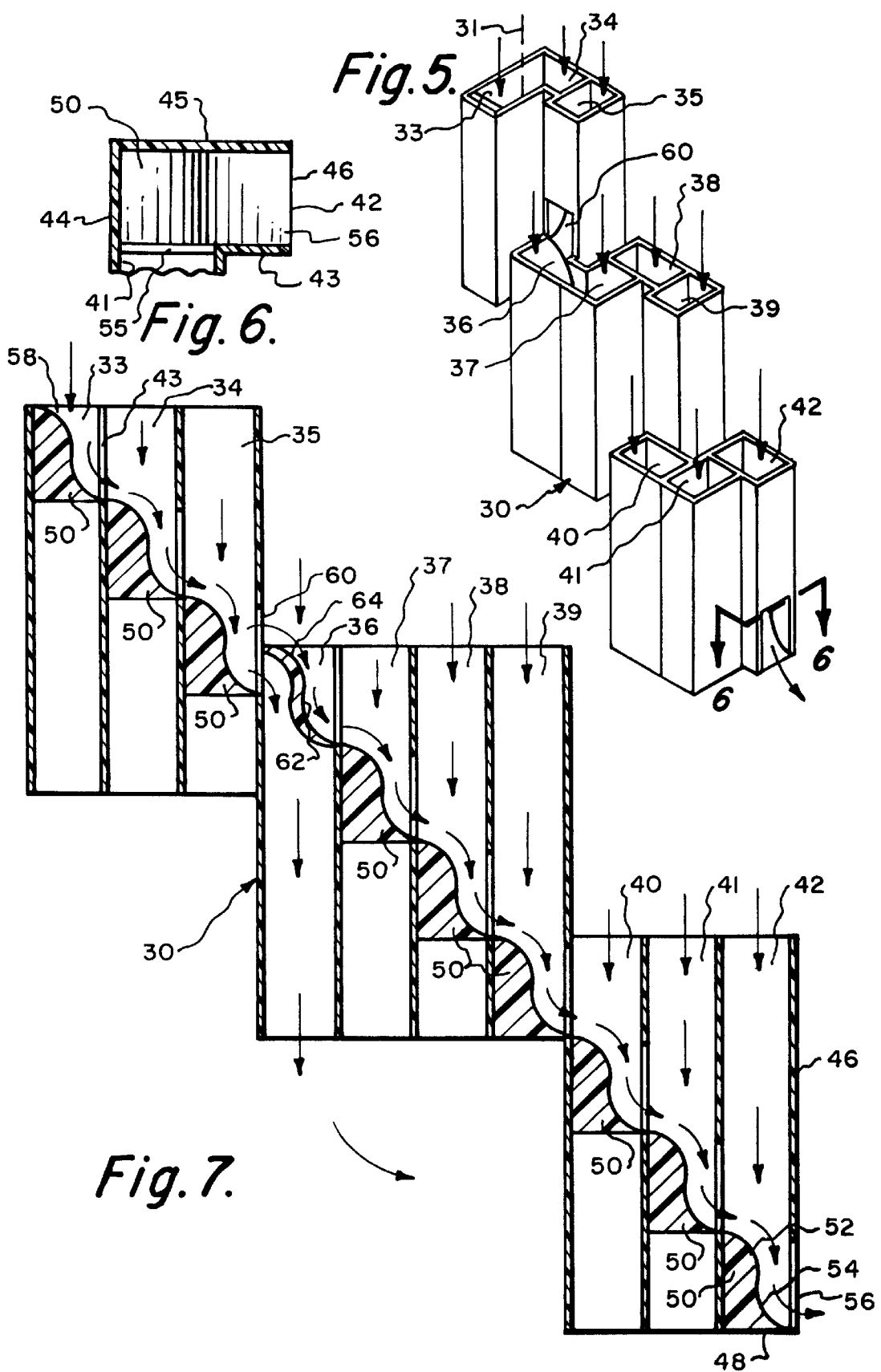

FLUID MEDIA PARTICLE ISOLATING SYSTEM

BACKGROUND OF THE INVENTION

1. Field of the Invention

This invention relates to systems and methods of preventing contamination of a contaminant-free media volume and more particularly relates to a fluid media particle isolator between a contaminant-free media volume and a contaminated particle generating media volume.

2. Background Information

There is a requirement in some industries and applications to maintain a containment-free environment. This requirement means that there must be an isolation and separation of contaminated media from containment-free media. The processing of wafers to manufacture semiconductors is a good example of this requirement. Particles that might contaminate the wafers from which semiconductors are built must be kept isolated.

The wafers from which semiconductors are built are stored in large contaminant-free enclosures known as storage and transfer systems. The wafers stored in contaminant-free containers or moved in and out of the storage area by machinery known as a transfer system. The transfer systems use linear and rotary activators to transfer the wafers to and from the storage area. These actuators necessarily generate particles that can contaminate the wafers. The contamination of the wafers from these particles is a major cause of device failure and rejection during the manufacturing process.

Accordingly there are many techniques employed to isolate the media around the wafers from the media where the particles are generated by the machinery. One technique scavenges the area around the machinery where particles are generated with a vacuum.

This technique does somewhat reduce the migration of particles from the area of contaminated media to the containment-free media area. However a disadvantage and limitation of this vacuum technique is that a flexible mechanical separation is needed between the containment-free (clean zone) media area containing the wafers and the contaminated area of mechanical equipment which generates particles. The flexible mechanical separation is usually a sealing band made of flexible plastic or metal. The sealing band must be flexible to allow a mechanical actuator to transmit work such as moving wafers to and from storage. An identified problem of using the flexible mechanical band to create a differential pressure for the vacuum to be effective and help mechanically isolate contaminating particles from the wafers is the mechanical band produces contaminating particles when the mechanical actuator passes through the band.

The current state of the art for media isolation to prevent contamination includes the use of a physical barrier between the contaminant-free media volume and an adjacent media volume that may contain contaminates. These barriers either involve movable mechanical parts or encounter movable mechanical parts. When moving mechanical parts make contact or rub against one another they invariably produce particles that can contaminate a contaminant-free media volume. One example of such a system is disclosed and described in U.S. Pat. No. 5,615,988 of Weisler et al issued Apr. 1, 1977. This patent discloses a wafer transfer system having moving transfer system to transfer wafers from carriers in a storage area. A door in a wall separates the storage area from the transfer area. The door is opened to provide access to wafers in a storage carrier. The transfer system moves through the door to retrieve wafers. All these moving parts are going to cause a release of particles, known generally as "wear", that can contaminate the wafers.

In the case of the mechanical seals described above, they are flexible to allow a transfer mechanism to move from one media volume to another to retrieve wafers. These parts rub together and produce contamination. Attempts to prevent the contamination involve creating a differential pressure by increasing pressure or applying a vacuum to one media volume. The combination of the mechanical seal with the differential pressure in most common applications creates a bias and establishes an unidirectional flow from one media volume to an adjacent media volume. Generally this is away from the contaminant-free media volume and toward the contaminated particle generating media volume. While these methods help they are not entirely effective to prevent a back flow of contaminating particles from entering the contaminant-free media volume particularly when the mechanical seal makes contact with the transfer mechanism.

It is thus one object of the invention to produce a fluid media isolator that differs from current state of the art devices by having no contacting, sliding, or rubbing parts when a transfer system actuator arm moves.

Another object of the present invention is to have a fluid media isolator that transfers clean media from the particle free (clean zone) wafer process area toward the particle generating contaminated (dirty zone).

Yet another object of the present invention is to provide a fluid media isolator that mechanically isolates a contaminant-free zone and a contaminate generating zone with a barrier comprises of tortuous media zone.

Still another object of the present invention is to provide a fluid media isolator on both sides of a transfer system actuator arm for forward or reverse travel with a linear actuator.

In yet another object of the present invention the fluid media isolator is mounted on both sides of an actuator arm for clockwise and counter-clockwise movement for a radial actuator.

Yet another object of the invention is to provide a device for isolating one volume of media from an adjacent volume of media that have a common connection between them.

Another object of the invention is to provide a device that can transfer media from one volume to another volume in a unidirectional manner while biasing back flow from one volume to another.

Still another object of the invention is to provide a fluid media isolator that can transfer and mix one media volume with another and pump in one direction.

Still another object of the invention is to provide a fluid media isolator comprised of a tortuous path separating a contaminant-free media volume from a contaminant generating volume and a fluid transfer device intersecting the tortuous path mounted for movement with the transfer system.

Another object of the present invention is to provide a fluid transfer device comprised of a plurality of vessels or cells that transfer fluid media from one vessel to another that is mounted in a tortuous path for movement with the transfer system actuator. The fluid transfer device pumps unidirectionally with each movement of the transfer device to establish unidirectional flow with substantially no back-stream preventing any particles generated by a drive system for contaminating the containment-free media volume.

BRIEF DESCRIPTION OF THE INVENTION

The purpose of the present invention is to provide a system and method of isolating contaminant-free media volume from a particle generating and contaminated media volume.

The system and method of the invention separates and transfers volumes of media of one mechanically separated zone to another media volume. The media volumes are separated by a pair of adjacent walls having a tortuous or serpentine path formed between them. The tortuous path is formed by alternating interleaving partitions or fins on the inside surfaces of the walls. The alternating partitions extend the full length of the wall forming a media volume in the tortuous path between the walls. The walls separate the contaminant-free media volume or zone from the contaminated volume and has an entrance at one end communicating with the contaminant-free media volume and an exit to the contaminated media volume at the opposite end. Thus the space in the wall forms a continuous tortuous path between the two media zones.

A pump is formed by a series of vessels or cells coaxially integrated in the tortuous path between the walls. The series of vessels or cells are mounted on the wafer transfer actuator arm for reciprocating linear travel within the tortuous or serpentine path between the walls. The series of vessels form an impeller that propels media from the contaminant-free zone toward the contaminated zone as it moves up and down between the walls with movement of the transfer system actuator arm.

The series of vessels or cells of predetermined length offset vertically or axially from each adjacent cell and horizontally from the entrance of the tortuous path toward the exit. Each cell has an entrance and an exit with the outer wall in close proximity but spaced from the walls and partitions the tortuous path. There are no part that can make contact or web together. The cells are arranged so an exit from one cell dumps fluid media into the adjacent cell. Each cell entrance is open at the top with a slightly larger exit transitioning to and directing or dumping media into the adjacent cell. A contoured surface of baffle in each cell provides a transition to enhance the flow of media from the entrance to the exit to dump its volume of media into the adjacent cell. The construction of the series of vessels or cells each being open to the media in the tortuous path, and offset axially and having a contoured transition surface in each cell biases and promotes flow only in the direction from the entrance to the exit with substantially no backstream or migration of contaminating particles into the contaminant-free media volume.

The system when tested showed zero migration of contaminants from the contaminated media volume to the contaminant-free media volume. This indicates that there were either no contaminating particles flowing to the contaminant-free media volume or there were so few particles that they could not be accurately detected. Thus a system with substantially no moving parts itself and moved only by its connection to the mechanics of the wafer transfer system has proved to be an effective and outstanding media isolating barrier.

In a second embodiment the fluid media transfer system is formed of a pair of intersecting cylinders having alternating circular interleaving partitions forming a circular tortuous path. The outer cylinder has a skirt fitting over the inner cylinder forming an entrance into the tortuous path formed by the series of attenuating circular partitions. A drive system is mounted at the center of the cylindrical tortuous path surrounded by a plurality of vent holes providing an exit for media drawn through the tortuous path.

Interestingly it was found that the cylindrical system works by rotation of one of the cylinders relative to the other to draw media from preferably a contaminant-free media volume for discharge through the vent holes to a non-contaminant-free volume. The partitions themselves that form the tortuous path act as impellers to propel the media from the entrance toward the exit or vent holes.

In an alternative embodiment of the cylindrical isolator, an impeller constructed of arcuate vessels of cells circumferentially offset could be integrated into the tortuous path. Each vessel or cell would have an entrance and an exit dumping into an adjacent cell except for the first and last cells. The series of cells would fit the contour of the tortuous path but be spaced sufficiently away from the walls of the tortuous path to prevent any contact that might generate contaminating particles.

In the latter embodiment the series of vessels or cells forming the impeller would be rotated or reciprocated within the tortuous path of the cylindrical isolator generating substantial flow from the entrance through to the exit or next holes.

The above and other objects, advantages, and novel features of the invention will be more fully understood from the following detailed description and the accompanying drawings, in which:

BRIEF DESCRIPTION OF THE DRAWINGS

FIG. 5 illustrates the operation of the fluid media transfer system in the fluid media isolating system.

FIG. 6 is a partial cross-sectional view of one vessel of a cell of the fluid media transfer impeller taken at 6—6 of FIG. 5.

FIG. 7 graphically illustrates the plurality of cells in the fluid media particle isolator impeller in a linear path to facilitate comprehension of the invention.

DETAILED DESCRIPTION OF THE INVENTION

Figure 1:
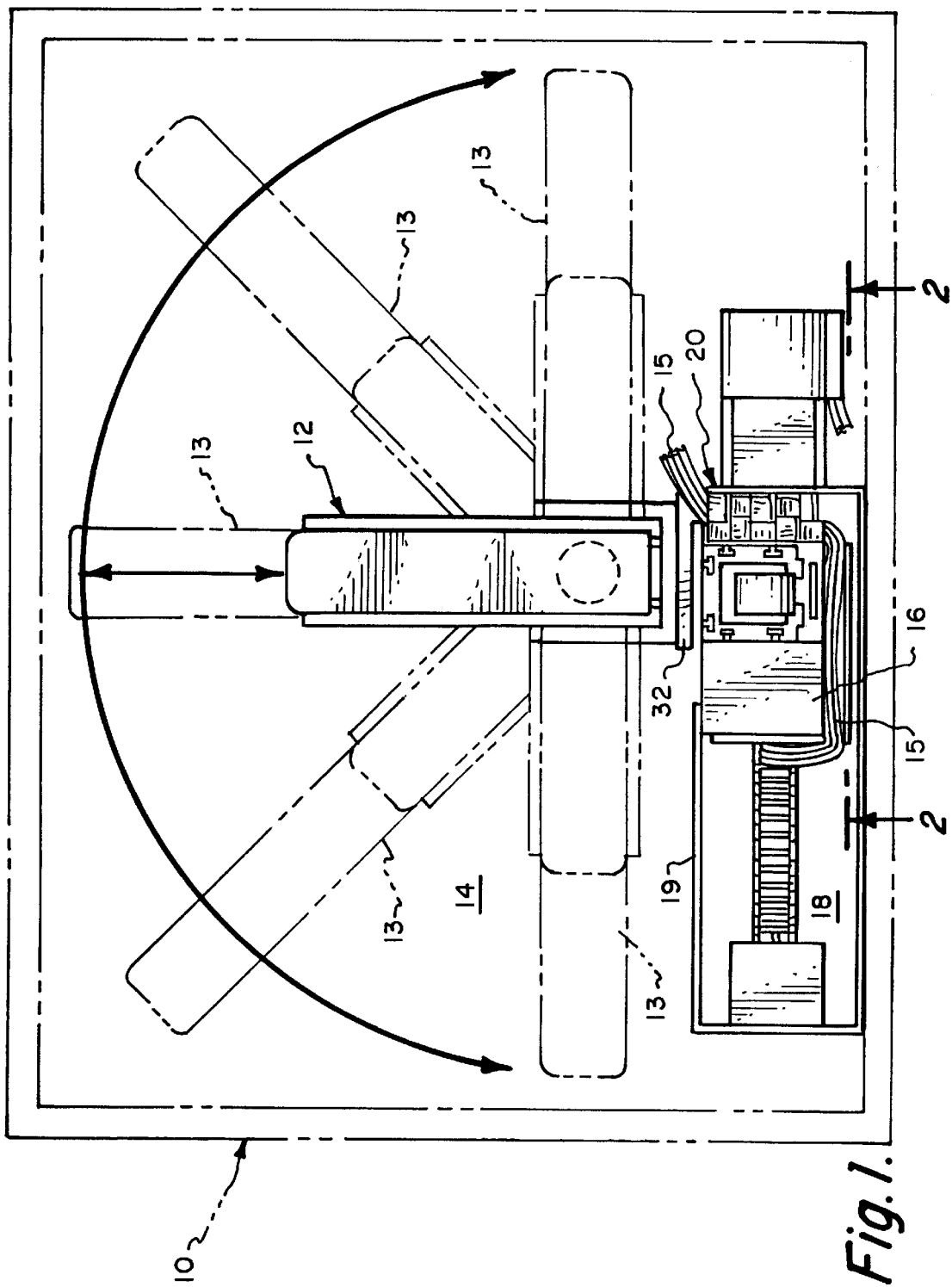
FIG. 1 is a top plan view of a semi-conductor wafer storage and transfer system having fluid media particle isolating system according to the invention.
Figure 2:
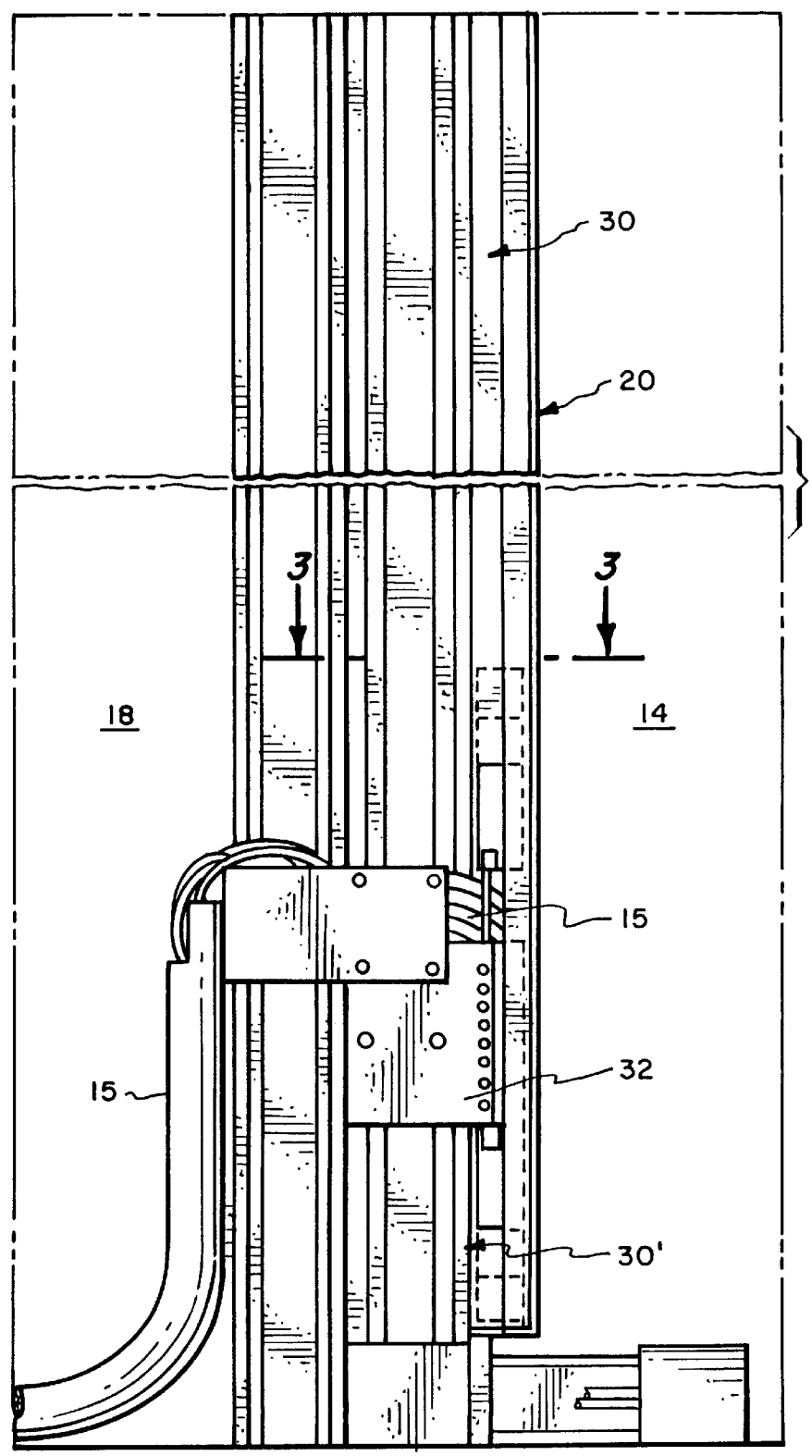
FIG. 2 is a sectional view of the fluid media particle isolating system taken at 2—2 of FIG. 1.

FIG. 1 illustrates a wafer storage and transmission system 10 and a transfer system 12 for storing or removing semi-conductor wafers in carriers (not shown). Volume or zone 14 in storage system 10 is a contaminant-free environment to prevent contamination of the semi-conductor wafers stored for processing. Drive system 16 is provided to move transfer system 12 to store or remove semi-conductor carriers or pallets for processing. It is essential that the contaminant-free volume 14 in storage system 10 be kept as free as possible from contaminating particles.

The drive system 16 moves transfer system rotationally and vertically to access the stored wafers. Drive system 16 has moving parts that can generate contaminating particles. Since drive system 16 is constructed to move transfer system 12 vertically as well as rotationally with an actuator arm 13 moving in and out to pick up and remove or store semi-conductor wafer carriers, it must be isolated from the contaminant-free volume or area 14 of storage system 10. Thus drive system 16 is surrounded by a contaminant volume or area 18 separated by enclosure 19 and operates through fluid media isolator 20. Fluid media isolator 20 transfers clean media from contaminant-free area or zone 14 to particle generating or contaminant zone 18. This prevents any contaminating particles generated by drive system 16 from migrating into contaminant-free zone or area 14.

Fluid media isolator 20 is mounted on both sides of drive system actuator or platform 32 for transfer system 12 allowing transfer system to travel forward and reverse for a linear actuator or clockwise and counter-clockwise movement from a radial actuator. Flow media isolator 20 can transfer media from contaminant-free zone 14 to the contaminant zone 18 in unidirectional manner while biasing backflow to prevent particles from entering contaminant-free zone 14.

The purpose of fluid media isolator 20 is to isolate contaminant-free volume or zone from contaminant generating zone 18 and transfer contaminant-free volume unidirectionally, without any separate moving parts.

Figure 3:
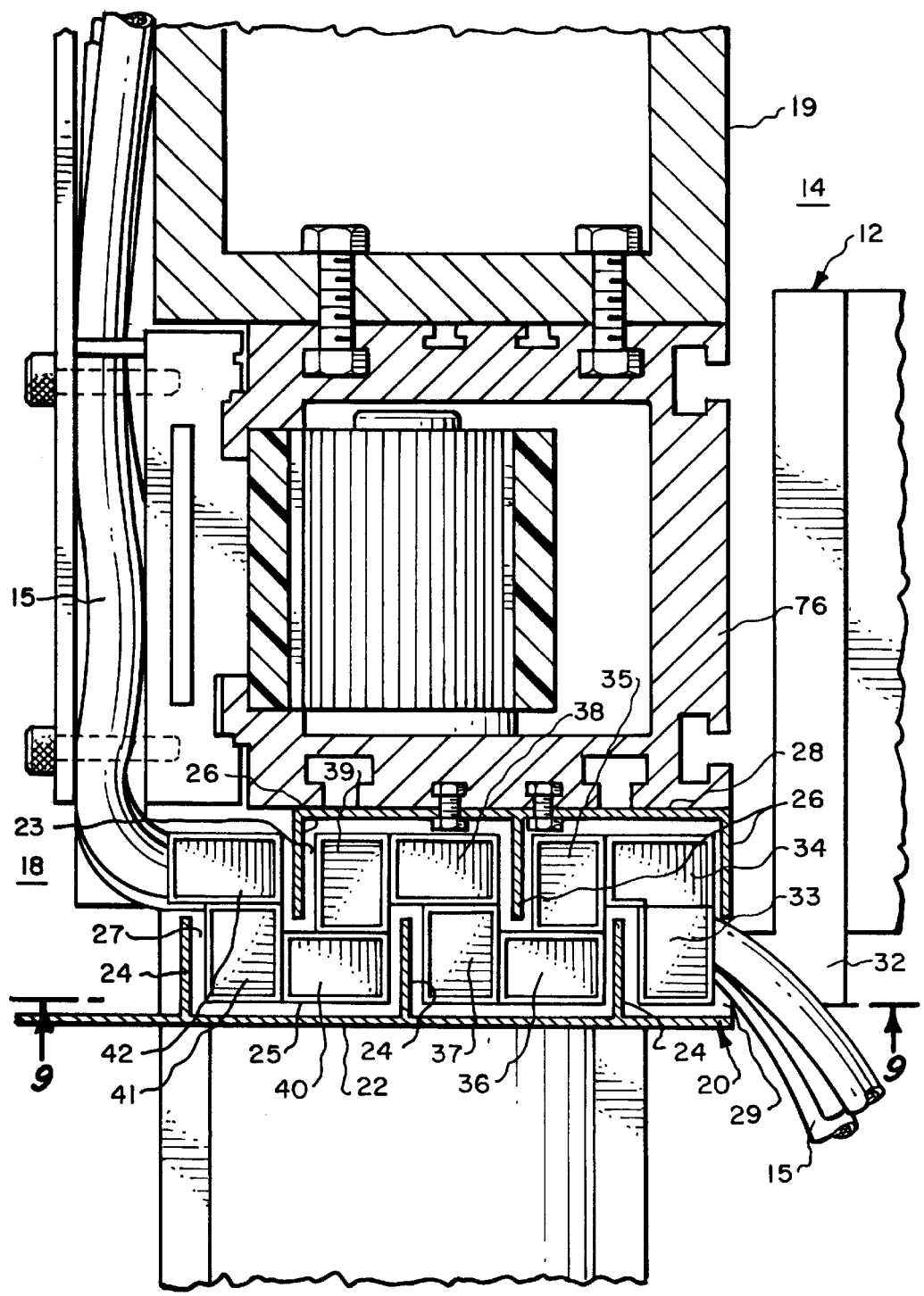
FIG. 3 is an enlarged partial sectional view of the fluid media particle isolating system constructed according to the invention taken at 3—3 of FIG. 2.

Fluid media isolator 20 constructed according to the invention is shown in greater detail in FIGS. 2 through 7. Fluid media isolator 20 is comprised of a first wall 22 having partitions or fins 24 that interleave with similar partitions or fins 26 attached to a second wall 28. The two walls 22 and 28 with interleaving partitions 24 and 26 form a tortuous path 25 communicating between contaminant-free zone 14 and contaminated or contaminant generating zone 18 as illustrated in FIG. 3. Chambers 23 between interleaving partitions 34 and 26 form tortuous path 25. Five chambers 23 are shown in FIG. 3. Actuator arm 32 of transfer system 12 and all electronic cable connections pass through this tortuous path from contaminant generating zone 18 to contaminant-free zone 14. Tortuous path 25 between walls 22 and 28 isolates the contaminant-free zone 14 from contaminated zone 18.

A unique aspect of the invention is the provision of an integral pumping system without any separate moving parts to enhance the flow of fluid media from contaminant-free zone 14 to contaminate the zone 18. Impeller 30 provides a pumping system by moving inside the tortuous path 25 between walls 22 and 28 it providing a differential pressure which enhances flow from contaminant-free zone 14 to contaminated zone 18. A series of vessels formed in cells in impeller 30 travel in tortuous path 25 between walls 22 and 28 by movement of the transfer driving system 16 and actuator or platform 32 to move transfer system 12. Thus as transfer or drive system 16 moves up and down in storage system 10, impeller 30 is mounted on the actuator platform 32 to move with the system. The vessels or cell walls of impeller 30 travel in close proximity to the walls or fins of fluid media isolator 20 but are separated therefrom to prevent any generation of particles.

Figure 4:
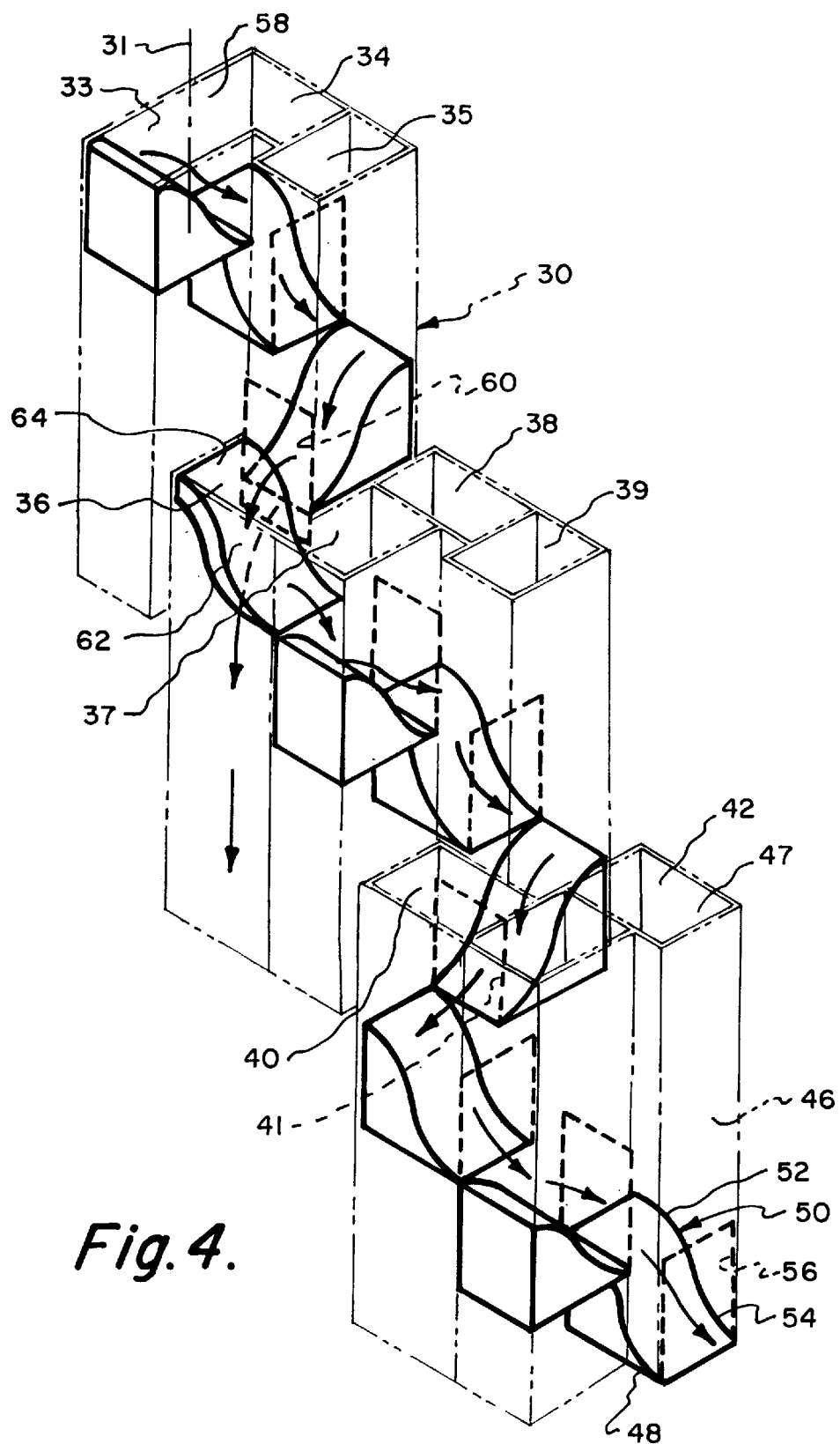
FIG. 4 is an isometric view of a fluid media transfer impeller of the fluid media particle isolating system.

Impeller 30 is shown schematically in the diagram of FIG. 4 and its operation illustrated in FIG. 5.

Impeller 30 is constructed of a series of vessels formed in cells whose shape is dictated by tortuous path 25 between fluid media isolator walls 22 and 28. Each vessel or cell has an entrance and an exit. The entrance is open to the interior of tortuous path 25 while the exit is connected for dumping fluid media to the next adjacent cell in the tortuous path. In the preferred embodiment of the invention the exit from one cell to the adjacent cell has a larger cross-sectional area than the entrance open to the media in the tortuous path 25.

Impeller 30 is constructed of a plurality of open cells forming a piston-like structure that has an axis 31 of motion. The cells comprise a group of rectangular or square cells having vessels formed by four walls and a transition or deflector surface creating a plurality of prismatic deflector cells. Impeller 30 is illustrated in FIGS. 5 and 6 and shows there are ten cells, 33 through 42. These cells are all parallel to axis of motion 31. Except for cell 33, they are substantially identical in shape as illustrated in FIG. 7. Only the last deflector cell 42 will be described in detail.

Deflector cell 42 is illustrated in the cross-sectional view of FIG. 7 and is bounded by four mutually perpendicular walls 43, 44, 45, and 46 which are all parallel to the axis of motion 31. Deflector cell 42 is open at top 47 (FIG. 4) and closed at bottom 48 by a contoured sloping bottom surface 50 that acts as a transition or deflector surface 50. Bottom surface 50 is a bent plane, sloping downwardly from wall 44 to wall 46. Upper portion 52 of deflector or transition surface 50 is convex and lower portion 54 is concave. The four walls 43, 44, 45, and 46 together with transition surfaces 50 form a vessel in each cell 33 through 42.

An entry port 55 through wall 43 opens above an upper edge of transition surface 50 and discharges straight across the bottom surface toward wall 45 which does not have an opening. Exit port 56 through wall 46 just above the lower edge of transition surface 50 receives flow that has been re-directed 90°.

It will be observed that all bottom transition or deflector surfaces 50 (which are close surfaces) look upwardly (see FIG. 6) to receive air through each deflector cell 33 through 42 directed sequentially down successive deflector cells from opening 58 of deflector 33 to exit port 56 of deflector cell 42. Deflector cell 33 differs from the others by not having an entry port in a side wall because it is the topmost deflector cell. As can be seen from the drawings, deflector cells 33 through 42 are grouped together axially so there is a continuous path (open at the top) along each bottom transition or deflector surface with 90° deflection occurring in each deflector cell to the next adjacent deflector cell. The result is a tortuous path of air along these contoured bottom deflector surfaces augmented by direct flow through tops of cells 33 through 42. When the impeller assembly is moved upward, the consequence is to provide a flow of fluid media toward exit port 56 from the vessel formed in deflector cell 42. Air will not appreciably flow in the reverse direction when the motion of impeller 30 is reversed because bottom deflector surfaces together form a closed surface. The only reverse path is through exit port 56.

There is one useful exception shown in FIGS. 6 and 7. FIG. 7 illustrates the plurality of cells 33 through 42 in a linear path to facilitate understanding of the invention. Of course as shown in FIGS. 5 and 6, the cells will follow the tortuous path 25 formed by the isolator walls 22 and 28 and partitions 24. The exception is the provision of one bottom transition or deflector surface 62 in cell 36 which intersects exit port 60 between third and fourth cells 35 and 36 in the group. Fluid media discharges from exit port 60 partly below bottom deflector surface 62 and partly into entry port 64 at the top of cell 36. This provides for a limited controlled by-pass of fluid media in both directions, but favors transfer of fluid media from above to below the transition surfaces 50 without noticeable backflow.

Transition or deflector surface 62 intersecting in approximately in the center of exit port 60 creates a pressure barrier at the center of tortuous path 25 (FIG. 3) as will be described in greater detail hereinafter.

Deflector cells 33 through 42 are encircled by a shroud or enclosure formed by walls 22 and 28 with interleaving partitions or blades 24 which are positioned closed to the surfaces of impeller 30 but do not touch them. Rubbing contact is forbidden because it would generate contaminating particulates. This device operates in a low pressure gradient, and flow is preferably from the higher to lower pressure gradient (which contains contaminating particulates).

The shape of each bottom transition or deflector surface 50 is a combination of a contoured, convex, and concave shape in each deflector cell about one (1) inch by three fourth (¾) inch cross-section. A useful deflector surface will extend about one (1) inch axially from top to bottom and intersect with the walls. An improvement in flow, may be obtained by making the exit ports from adjacent cells somewhat larger than the inlet ports at the top of the cells. That is, the exit ports between cells has a larger cross-sectional shape than the entry port at the top of each cell. This is achieved by making the height of each exit port larger than the largest dimension of each entry port at the top of each cell. Preferably the exit port has a cross-sectional area at least 5% greater than the entry port. The radius of curvature of convex surface 52 and concave surface 54 are the same and are about one half (½) inch.

As described previously, impeller 30 is comprised of a plurality of equal length deflector cells joined together to wind around and through tortuous path 25. Each deflector cell 33 through 42 forms a vessel for moving fluid media from clean zone 14 to contaminated zone 18 containing particulates. The vessel formed in each cell has a bottom transition or deflector surface 50 providing a transition for directing fluid media from an inlet in one cell through an exit to an adjacent vessel having a similar transition bottom surface. Each bottom transition surface 50 is axially or vertically offset a distance that is equal to the height of the transition surfaces creating vessels of different values.

Transition surfaces 50 are comprised of convex and concave surfaces of approximately equal radius. Each transition surface 50 has a width equal to the cell width and the height that can be approximately up to twice the width. The cells 33 through 42 are preferably in groups of at least three with one cell providing an alternative intermediate transition between the first group of three (cells 33 through 35) and the second group of four (cells 36 through 39).

In each case the exit from one vessel in a cell through the adjacent, attached vessel, is larger than the entrance at the top of the vessel. This enhances the flow of fluid media from the higher to lower pressure gradient through impeller 30 from isolator entrance 27 to isolator exit 29 (FIG. 3) both of which extend the full length of isolator 20. The vessel formed in transitory cell 36 has a transition surface that intersects exit 60 of cell 35 in the first group of three cells approximately at the center. This configuration dumps a portion of fluid media below transition surface 60 with some of the fluid media from the first group being dumped into entrance 64 of transitory cell 36.

This is done for two reasons. The first reason is to create a pressure barrier at the center of the tortuous path 25 (FIG. 3). Therefore when operating a very low pressure differential, the additional centralized pressure evenly disperses and creates a pressure barrier of clean air (fluid media) between the two volumes of media being isolated. A second reason is to minimize any vacuum affect created at the following side of fluid media isolator 20. The remaining six vessels in cells 37 through 42 after the transitory vessel in the fourth cell 36 pump fluid media from clean air side 14 to the "dirty" (contaminated) low pressure side.

FIG. 7 graphically illustrates the plurality of vessels in cells 33 through 42 all in the same plane to facilitate understanding of the invention and indicate the flow of fluid media through isolator 20. The first three vessels in cells 33 through 35 in the first group of three deflector cells deliver fluid media from first vessel in cell 33 to the adjacent vessel in cell 34 and third vessel in adjacent cell 35 through exit ports 43 and 45 for delivery through exit 60 to transitory cell 36. Transitory vessel in the fourth deflector cell 36 intersects exit port 60 at approximately the center of the exit. Thus the portion of fluid media volume for the first three vessels is dumped below transitory surface 62 to exit through the bottom of fourth deflector cell 36.

As described previously, the reason for this is to create a pressure barrier at the center of tortuous path 25. Thus if the system is operating at very low pressure differential, the added centralized pressure evenly disperses and creates a pressure barrier of clean air between the two volumes of media being isolated. Another reason for the transitory vessel is to minimize any vacuum affect created at the following side of the isolator 20. The remaining six vessels in cells 37 through 42 are in groups with sequentially increasing volumes determined by the position of transition surfaces 50 and pump fluid media from clean zones 40 to the contaminated (i.e., dirty) low pressure zone 18.

In the preferred embodiment each deflector cell is approximately four (4) inches long in a group of three (33, 34, 35), a group of four (36, 37, 38, 39), and then three deflector cells (40, 41, 42). The second group of four cells is axially offset from the first group of three cells while the third group of three cells is axially offset from the second group of three cells. This allows the vessels formed in each cell to be axially offset a distance approximately equal to the height of the bottom transition surface 50 to provide a flow from the inlet through the outlet of an adjacent cell as shown in FIGS. 6 and 7. Transitory or pressure barrier deflector cell 36 is provided with a transition surface 62 constructed to intersect exit 60 from the third vessel 35 to dump some of the fluid media below impeller 30 providing a pressure barrier at the center of tortuous path 25.

Impeller 30 operates as illustrated in FIG. 5. This figure shows fluid media entering the top of vessels formed in each cell 33 through 42 to force a transition of fluid media from one vessel to the attached adjacent vessel until it exits through exit port 56 in last pumping vessel in deflector cell 42 to contaminated region 18.

Figure 8:
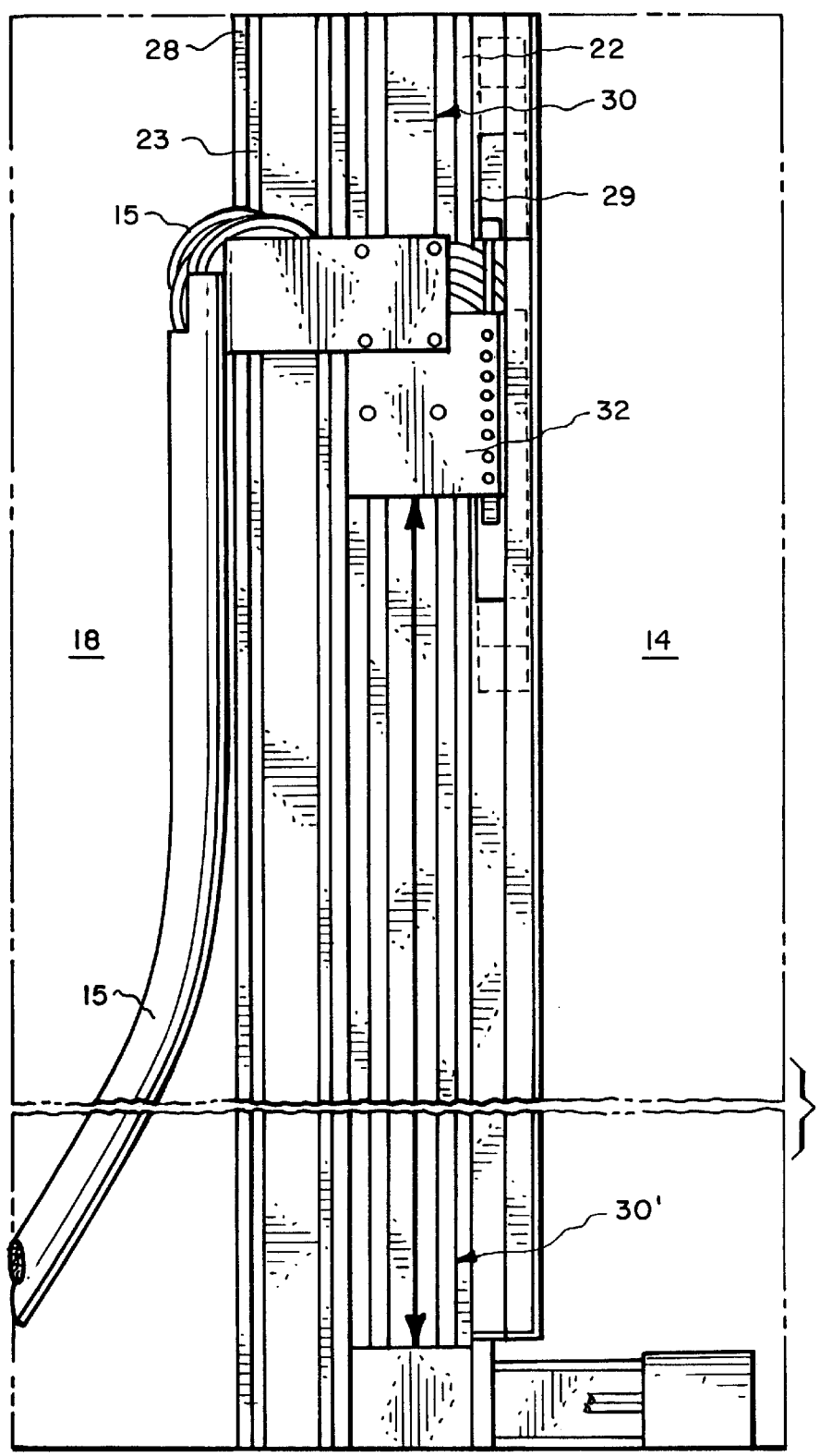
FIG. 8 is a view similar to FIG. 2 illustrating the movement of the transfer system actuator which creates the pumping action of the impeller in the fluid media particle isolator.
Figure 9:
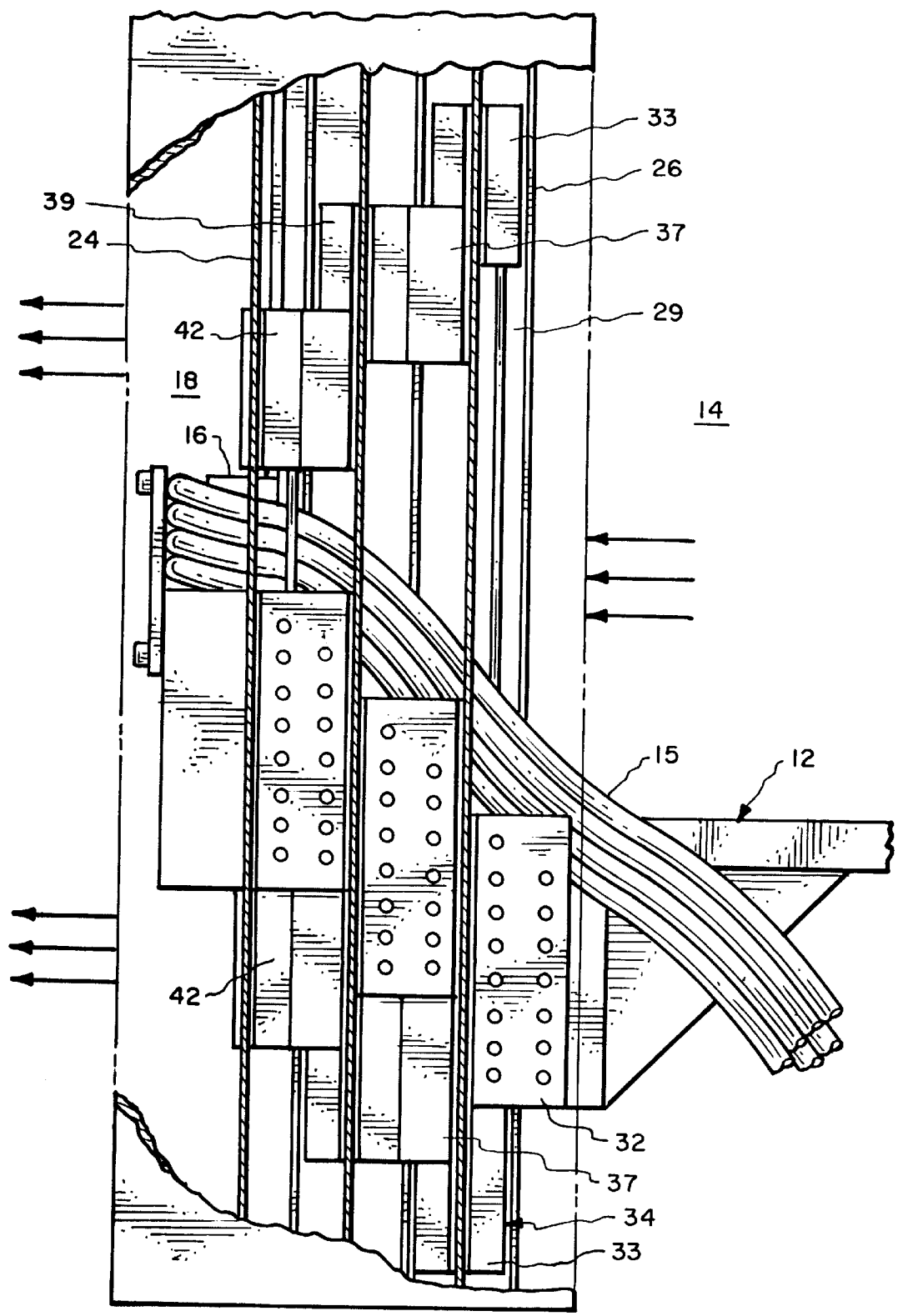
FIG. 9 is another view of the rear of the fluid media isolating system illustrating the actuator platform in the construction of fluid media transfer system taken at 9—9 of FIG. 3.

The system is provided with a pair of impellers 30 and 31' in media isolator 20 as shown in FIGS. 8 and 9. Impeller 30 is above transfer system actuator 22 (FIG. 2) while impeller 30' is below the actuator. Thus as drive system 16 (FIG. 1) moves actuator 32 and transfer platform 12 up and down in wafer storage compartment 10 (FIG. 8), fluid media is transferred by vessels in impellers 30, 30' in tortuous path 25 from clean air side 14 to the contaminated side 18 preventing any contamination of semi-conductor wafers. Impeller 30' is identical to impeller 30 but is oriented in a reverse configuration. That is, it amounts to mounting impeller 30 shown in FIG. 6 on actuator 32 up side down.

Impellers 30 and 30' are mounted on actuating mechanism 32 which passes through and travels in tortuous path 25 to transfer system 12 to remove or store pallets or semiconductor wafer carriers inside storage system 10. Actuating mechanism or platform 32 follows the shape of tortuous path 12 and can be a series of plates connected between transfer system 12 and drive system 16. Electrical cabling 15 for the system also passes through the tortuous path and follows the shape of the series of plates 32 that actuate transfer mechanism 12.

Preferably there are two impellers 30 and 30' shown in FIGS. 8 and 9 above and below actuating platform 32 to take advantage of the vertical movement of the actuating platform 32 in tortuous path 25. Thus impeller 30 above actuating platform 32 and impeller 30' below actuating platform 32 provide a double acting pumping action (FIG. 8) each time actuating mechanism moves up and down in tortuous path 25. This effectively almost continuously creates a unidirectional flow of fluid media from contaminant-free zone 14 to contaminant generating zone 18.

Impeller 30' below actuating platform 32 is identical with impeller 30 transitioning from contaminant-free area or zone 14 to contaminated or contaminant generating zone 18. That is the second, third, and subsequent cells are each offset vertically or axially from the adjacent cell towards actuating mechanism 32. This enhances or generates flow for contaminant-free zone or area 14 to contaminated generating zone 18.

Figure 10:
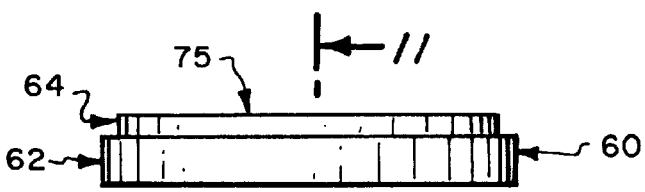
FIG. 10 is an optional embodiment of a cylindrical fluid media particle isolating system constructed according to the invention.
Figure 11:
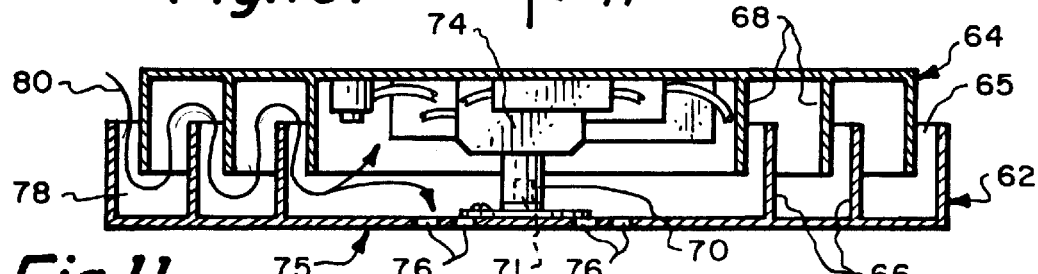
FIG. 11 is a sectional view illustrating the construction of the cylindrical fluid media particle isolating system taken at 11—11 of FIG. 10.
Figure 12:
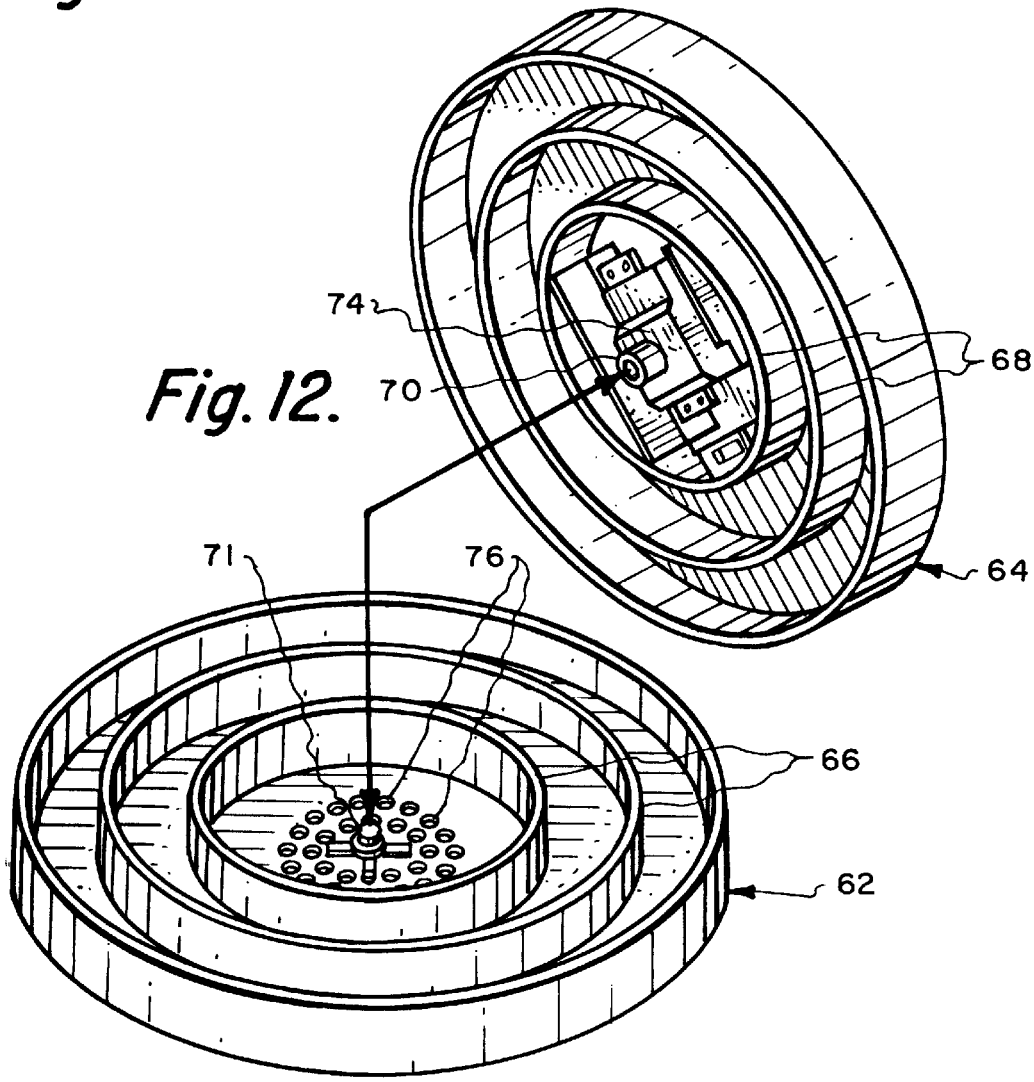
FIG. 12 is an exploded view illustrating the interior of the cylindrical fluid media particle isolating system of FIG. 10.

An optional embodiment is illustrated in FIGS. 10 through 12. It was discovered that the same principles that are at work with the fluid media isolator 20 of the prior embodiment can be applied to a cylindrical configuration as shown in FIGS. 10 through 12. In FIG. 10 cylindrical fluid media isolator 60 is shown comprised of a first cylinder 62 mating with a second cylinder 64. Cylinder 62 has a plurality of cylindrical partitions or fins 66 that interleave with a plurality of cylindrical partitions 68 inside cylinder 64. Cylinder 62 has a socket 70 receiving drive shaft 71 connected to drive system 74 which in turn is mounted in the center of cylinder 64. Drive system 74 thus can rotatably drive cylinder 62 relative to cylinder 64 or vice versa. A plurality of discharge vents 76 are provided in the center of cylinder 62 around drive shaft 70.

Interleaving partitions or fins 66 and 68 in cylinders 62 and 64 provide a tortuous path 78 between the cylinders. It was discovered that rotation or reciprocation of cylinder 62 relative to cylinder 64 (or vice versa) will draw fluid media through inlet 65 as indicated by the arrow through tortuous path 78 to flow out or be discharged through aperture or vents 76 without the need for any additional pumping devices such as a piston or impeller as shown in the prior embodiment. The cylindrical fluid media particle isolator 75 can thus be used in any particular area where it is important to continue to keep contaminant-free fluid volume flowing toward contamination generating or contaminated areas. Rotation of cylinder 62 around cylinder 64 creates a continuous flow of fluid from entrance or inlet 65 in the direction indicated by arrow 80 to exit or vents 76 preventing any backstream or back pressure effectively keeping contaminant-free media flowing out of the cylindrical fluid media isolator 60.

Optionally an impeller shaped to fit the curvature of the tortuous path between partition 66 and 68 could be added to cylindrical fluid media isolator 75. In this case an impeller would be constructed to have cells at entrance 65 that are circumferentially spaced from adjacent cells until the last cell dumps fluid media into space surrounding exits or vents 76. In this alternate embodiment both cylinders 62 and 64 would remain stationary while impeller inside tortuous path 78 would rotate or reciprocate drawing contaminant-free fluid from entrance 65 to exit vents 76.

Figure 13:
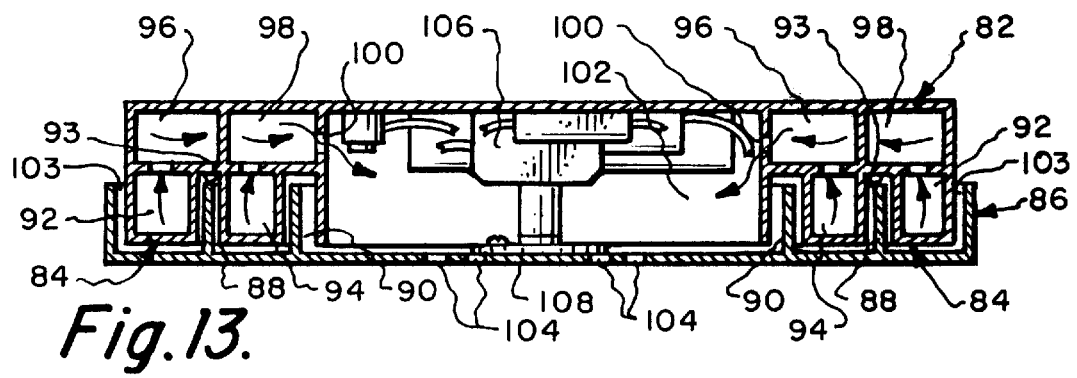
FIG. 13 is a sectional view of an optional embodiment of the cylindrical fluid media transfer system of FIG. 10.
Figure 14:
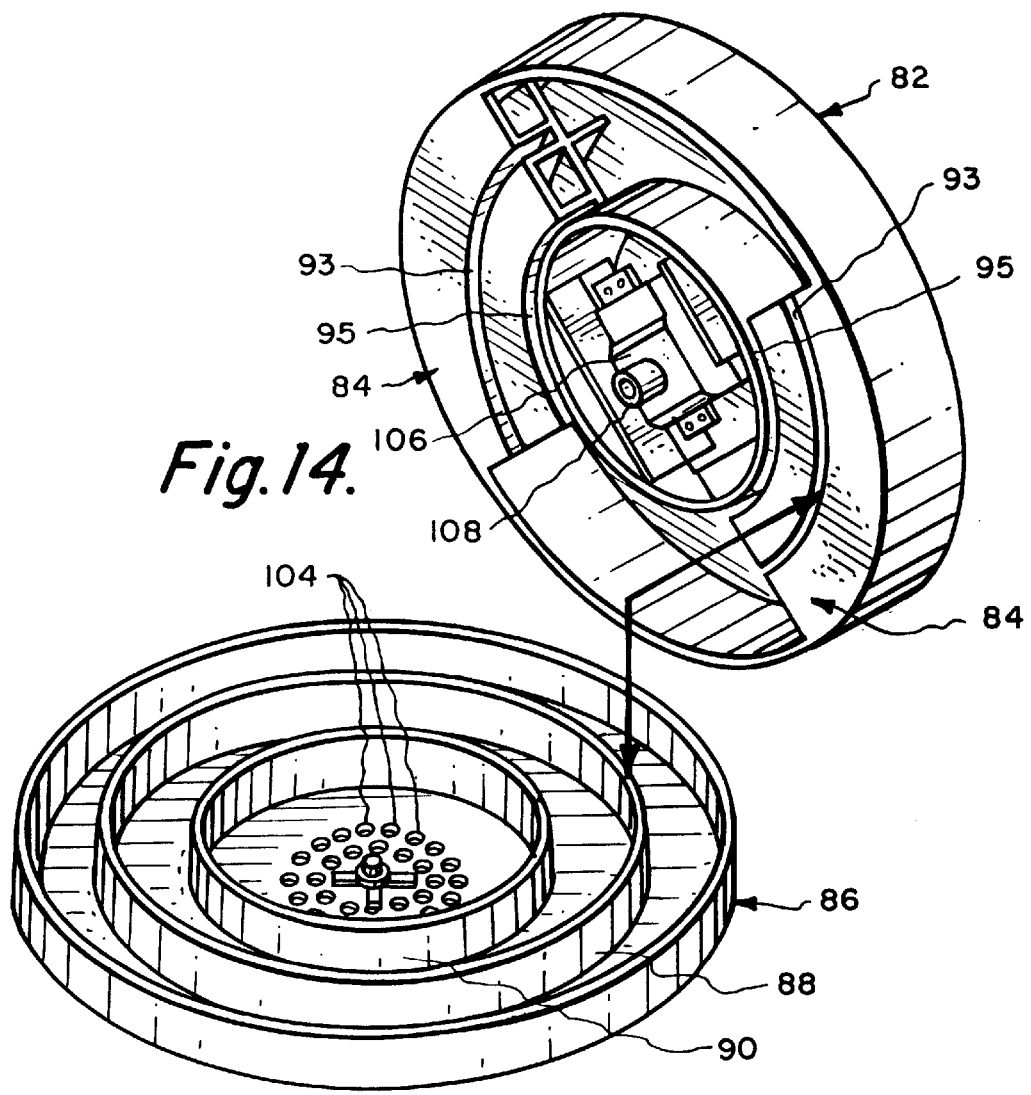
FIG. 14 is an exploded view of the embodiment of FIG. 13 showing the interior construction.

Another optional embodiment is illustrated in FIGS. 13 and 14. This embodiment is an optional design of a cylindrical fluid media isolator similar to the embodiment of FIGS. 10 through 12. This embodiment employs a first cylinder 82 having an integral or built-in impeller 84 interleaving with a second cylinder 86 having cylindrical partitions or rings 88 and 90.

In this embodiment a pair of identical built-in integral impellers 84 are incorporated into cylinder 82. Integral impellers 84 are formed of arcuate, rectangular sections 92 and 94 having a space for receiving interleaving rings 88 and 90. Rectangular arcuate sections 92 and 94 are similar to the cells 33 through 42 of the linear impeller. Cells 92 and 94 have transition surfaces to deflect or flow of fluid medium into vessels formed in upper compartments 96 and 98 to flow out through exit 100 into central area 102 for discharge out through apertures or vents 104 in cylinder 86. Drive system 106 mounted in cylinder 82 is connected to cylinder 86 by a drive shaft 108. Drive system 106 thus rotates or reciprocates cylinder 82 forcing air through cells of compartments or vessels 92 and 94 into upper compartments 96 and 98 to exit into central area 102 to be discharged out through vents 104.

Interleaving partitions or rings 88 and 90 engage slots 93 and 95 between cell compartments 92 and 94 to provide a tortuous flow from an entrance 103 through the system to exit apertures 104.

Thus there have been described a unique fluid media isolating system separating and transferring volumes of fluid media from one mechanically separated zone to another. The system involves a fluid media isolator that is constructed to provide a tortuous fluid path communicating between a contaminant-free zone and a contaminated zone. The tortuous fluid path is comprised of an array of interleaved partitions or fins mounted on adjacent walls to form a path for transferring fluid media. In the first embodiment a series of vessels or cells mounted on an actuator for moving a semi-conductor wafer transfer system act as a pump to unidirectionally transfer fluid media from the contaminant-free zone to the contaminated zone. Each vessel or cell in the impeller is open to the fluid media in the tortuous path and is connected by an exit to an adjacent vessel that is axially offset. Each vessel or cell includes a transition surface or baffle that enhances the transfer of media entering one vessel or cell to the next adjacent cell. The baffle or transition surface in each cell is constructed with a contour that limits back pressure and efficiently transfers media entering the tortuous path to the next adjacent vessel. The flow from one vessel to another or from cell to cell is through the contoured transition surface that biases flow in a single direction.

In alternate embodiments, a cylindrical fluid media isolator has a pair of interleaved cylinders having partitions forming a tortuous path from the outer perimeter toward the center. Another option is to include arcuate impellers between the two cylinders or built into one of the cylinders. A plurality of vents around a drive shaft for rotating one of the cylinders relative to the other or the impeller relative to the is cylinders is provided as an exit for fluid media traveling through the fluid media isolator.

In a preferred embodiment, one of the cylinders is rotated or reciprocated relative to the other cylinder to draw fluid media through the tortuous path for exit through vents at the center of one of the cylinders. Alternatively an impeller could be provided following the tortuous path that is similar to the linear impeller but shaped to fit the contour of the cylinders or could be integral with one of the cylinders. This impeller would be reciprocated between the two cylinders in the tortuous path to create flow from an entrance at the beginning of the tortuous path to the vents at the center of the cylindrical fluid isolator.

This invention is not to be limited by the embodiment shown in the drawings and described in the description which is given by way of example and not of limitation, but only in accordance with the scope of the appended claims.

What is claimed is:

1. A fluid media particle isolating system comprising;
   a tortuous path formed by a plurality of chambers open on one side to a clean fluid media zone and at the other side to a contaminated fluid media zone;
   an impeller apparatus for drawing clean fluid media from said clean fluid zone and forcing said fluid through said torturous path into said contaminated fluid media zone;
   said impeller comprised of a plurality of cells forming vessels in each chamber of said tortuous path each of said vessels being inter-connected with an adjacent vessel in an adjacent chamber for moving said fluid through said tortuous path;
   said impeller being mounted on a moving platform for reciprocal movement in said plurality of chambers;
   whereby fluid media is transferred from said clean fluid media zone to said contaminated fluid media zone thereby isolating clean fluid media zone from contaminating particles.

2. The system of claim 1 including a contoured transition surface in each vessel of said plurality of vessels for directing and enhancing the flow of fluid from an inlet port in each vessel to an exit port in each vessel.

3. The system according to claim 2 in which said tortuous path is formed by a plurality of sequential chambers separated by partitions.

4. The system according to claim 3 in which said tortuous path is formed by a first partition overlapping and interleaving with a second partition forming an inlet from the clean zone into said tortuous path; subsequent partitions formed on side walls of said plurality of vessels forming a plurality of chambers.

5. The system according to claim 2 in which said tortuous path is formed by five sequential chambers.

6. The system according to claim 2 in which an impeller formed by said plurality of vessels is mounted on opposite sides of said reciprocal platform whereby said system forms a dual acting pump.

7. The system according to claim 6 in which said impeller is comprised of at least three vessels in each adjacent chamber pair forming said tortuous path.

8. The system according to claim 7 in which each vessel in said plurality of vessels is axially offset from an adjacent vessel.

9. The system according to claim 8 in which each vessel is offset from an adjacent vessel and amount equal to the axial length of said transition surface.

10. The system according to claim 2 in which each transition surface in each of said vessels has a curvature that enhances the flow of fluid from one vessel to an adjacent vessel.

11. The system according to claim 10 in which said exit port from each vessel to an adjacent vessel is larger than the inlet port to each vessel.

12. The system according to claim 10 in which the exit port of each vessel is at least 5% larger than the inlet port to each vessel.

13. The system according to claim 11 in which the contoured transition surface in each vessel has a constant curvature.

14. The system according to claim 13 in which said contoured transition surface is a bottom surface of each vessel adjacent said exit port.

15. The system according to claim 14 in which said contoured transition surface has a convex curvature and a concave curvature.

16. The system according to claim 15 in which said convex curvature and concave curvature has the same radius of curvature.

17. The system according to claim 16 in which each of said contoured transition surfaces has a height approximately equal to the height of said exit port.

18. The system according to claim 17 in which a contoured transition surface in one of said intermediate vessels in said impeller intersects an exit port from a preceding vessel to dump a portion of said fluid media below said impeller.

19. The system according to claim 18 in which said contoured transition surface intersects an exit port from a preceding vessel approximately in the center.

20. The system according to claim 19 in which said moving platform traverses said tortuous path from said contaminated fluid media zone to said clean fluid media zone.

21. The system according to claim 20 in which said moving platform is connected to a drive system in said contaminated fluid zone for axial movement in said tortuous path.

22. The system according to claim 2 in which said tortuous path is formed by a first wall and a second wall spaced apart and parallel to said first wall and a plurality of interleaving partitions extending perpendicular to said first and second wall; an inlet from said clear fluid media-zone formed at one end between said first and second walls and an outlet to said contaminated fluid media zone being formed at the other end of said first and second walls.

23. The system according to claim 22 in which there are at least two interleaving partitions on each wall.

24. The system according to claim 23 in which there are three interleaving partitions on each wall forming five chambers between said inlet and said outlet.

25. The system according to claim 22 in which said inlet and said outlet extend the entire length of said first and second walls.

26. A fluid media isolating system comprising; a first cylinder; a second cylinder mating with said first cylinder forming an inlet; an outlet being formed in the center of said first and second cylinders; and at least one circular partition on said first cylinder interleaving with at least one circular partition on said second cylinder to form a tortuous path;

a driver connecting said first cylinder to said second cylinder, said driver adapted to rotate one of said cylinders relative to the other of said cylinders; whereby fluid media is drawn into said inlet for ejection from said outlet thereby isolating fluid media on one side of first and second cylinders from the other side of said first and second cylinders.

27. The fluid media isolating system according to claim 26 in which there are at least two of said interleaving circular partitions on each of said first and second cylinders.

28. The fluid media isolating system according to claim 27 including an impeller formed in said tortuous path between said first and second cylinders.

29. The fluid media isolating system according to claim 28 in which said impeller is integrally formed in one of said cylinders.

30. The fluid media isolating system according to claim 29 in which said impeller comprises; a plurality of arcuate vessels formed between said circular partitions in one of said cylinders; said arcuate vessels constructed to direct fluid media from said inlet to the center of said mating first and second cylinders for discharge through said outlet.

31. The fluid media isolating system according to claim 30 in which said inlet extends around the periphery of said mating first and second cylinders.

32. The system according to claim 2 in which said impeller is constructed of ten vessels traversing said tortuous path.

33. The system according to claim 32 in which said exit port from one vessel is at 90 degrees to the exit port of the next adjacent vessel.

34. The system according to claim 33 in which said vessels are formed in a plurality of equal length nearly identical cells.

35. The system according to claim 34 in which said cells are formed in groups of at least three; each group being axially offset from the preceding group.

* * * * *